Dec. 7, 1926.
W. SEVILLE
1,609,778
LUBRICATED BEARING
Filed March 30, 1925
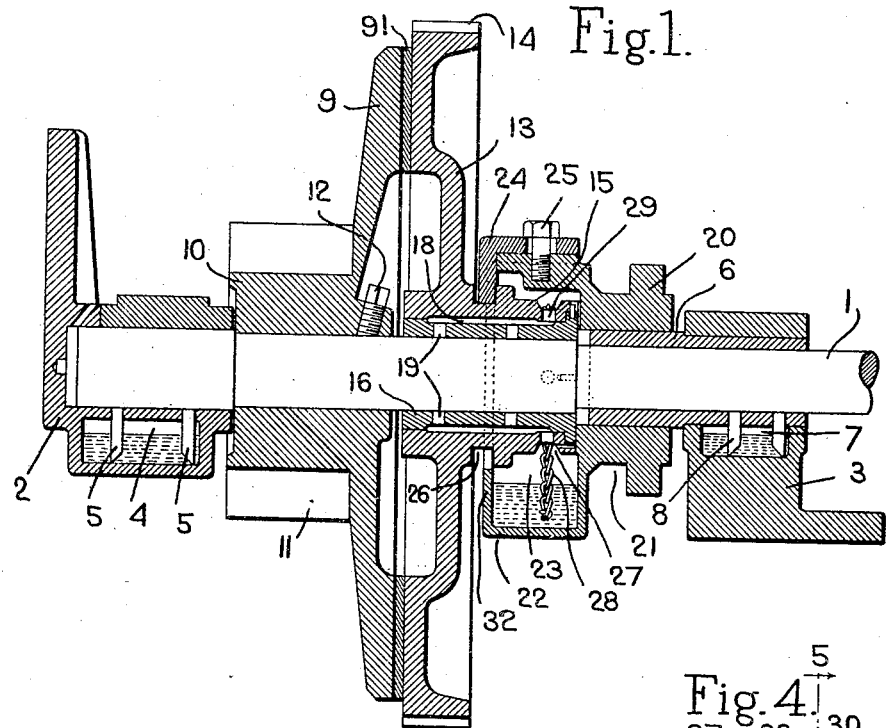
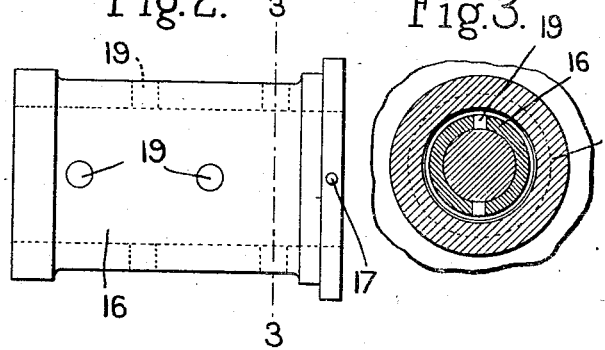
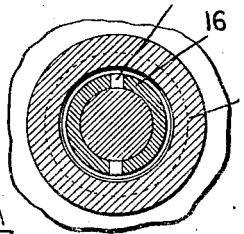
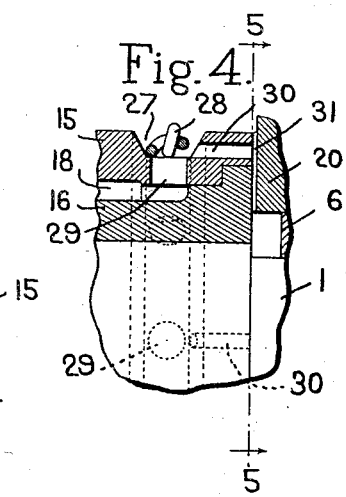
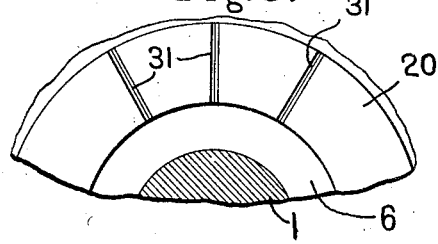
Inventor.
William Seville
by Heard Smith & Tennant.
Attys Patented Dec. 7, 1926.

1,609,778

UNITED STATES PATENT OFFICE.

WILLIAM SEVILLE, OF HOPEDALE, MASSACHUSETTS, ASSIGNOR TO DRAPER CORPORATION, OF HOPEDALE, MASSACHUSETTS, A CORPORATION OF MAINE.

LUBRICATED BEARING.

Application filed March 30, 1925. Serial No. 19,214.

This invention relates to a simple and efficient means for securing thorough lubrication of the bearing surfaces between a shaft and a rotating member such as a pulley, and also for thoroughly lubricating the end bearing surface between such a member and an abutting member fixed against rotation.

The object of the invention is further to provide a simple and efficient means wherein the lubricant maintained in a reservoir is continually taken and raised from the reservoir and fed to the bearing surface or surfaces in such a manner as to provide continuous and thorough lubrication.

The object of the invention is further to provide a simple and efficient means for the lubrication of the bearing surfaces of a clutch pulley such as used in looms and similar machines.

The nature and objects of the invention will appear more fully from the accompanying description and drawings and will be particularly pointed out in the claims.

The present invention is designed particularly for the lubrication of a friction clutch pulley such as is employed upon the shaft of a loom, but it is applicable to a wide range of uses and the construction illustrated, in so far as the main elements of the machine are concerned, is selected merely for a convenient disclosure of the invention.

In the drawings:

Fig. 1 is a view in vertical cross-section of a shaft, its bearings, and a friction clutch construction such as is employed in looms, together with a preferred form of the present invention embodied therein.

Fig. 2 is a top plan view of a bushing forming the inner shell of the hub of the pulley shown in Fig. 1.

Fig. 3 is a view taken in transverse cross section on the line 3—3 of Fig. 2.

Fig. 4 is an enlarged detail in cross section of the construction shown in Fig. 1.

Fig. 5 is a view taken in transverse cross section on the line 5—5 of Fig. 4 looking in the direction of the arrows.

The shaft 1, which, for example, may be the shaft of a loom, is shown as mounted in two bearings, 2 and 3. The construction of these bearings forms no part of the present invention and any suitable construction may be provided. The bearing 2 at the left is shown as provided with a lubricant reservoir 4 from which lubricant transmitting plugs 5 extend to the surface of the shaft to feed the lubricant in the reservoir to the shaft and secure the lubrication of the bearing. The bearing 3 at the right is shown as provided with an elongated bushing 6 fixed in, and definitely registering with, the bearing 3. A lubricant reservoir 7 is formed in this bearing and lubricant-transmitting plugs 8 extend from this reservoir through the bushing 6 to the surface of the shaft and thus secure the lubrication of the shaft in this bearing.

The lubricated bearing construction of this invention is shown in connection with a friction disk clutch pulley. In the construction illustrated a friction disk 9, provided with a suitable friction surfacing 91 and having a hub 10, which may be provided with gear teeth 11, is rigidly secured to the shaft between the end bearings and is shown as thus secured by a set screw 12. The pulley 13, which may also be provided with gear teeth 14, is mounted to rotate and also to slide upon the shaft 1 adjacent the friction disk. The pulley is provided with an extended hub 15 and preferably the portion of the hub which has its bearing on the shaft is in the form of a bushing 16, shown separately in Fig. 2. This bushing has a driving fit in the hub and is further pinned in place as by the pins 17.

An annular lubricant reservoir 18 is located in the hub. This is conveniently formed partly in the periphery of the bushing 16 and partly in the periphery of the surrounding hub portion of the pulley. A series of lubricant-transmitting plugs 19 extend through the hub shell, or in this case the bushing 16, between the reservoir 18 and the shaft and act to transmit lubricant from the reservoir and feed it slowly to the surface of the shaft. Such plugs, which may be made of wood with the grain running lengthwise, are a convenient means for affording an even and steady distribution of the lubricant to the surface of the shaft.

The clutch pulley 13 is slid back and forth on the shaft into and out of clutching engagement with the friction disk 9 by means of a sleeve 20 mounted to slide on the shaft; but held against rotation with respect thereto. This sleeve is preferably not mounted directly on the shaft, but rather on the bushing 6, which extends out from the bearing 3 toward the pulley for this purpose. This sleeve is grooved at 21 to receive the arms of a yoke or other suitable actuator. The end surface of the pulley hub, including the bushing 16, abuts the adjacent end surface of the sleeve 20 so that a thrust bearing is formed at this point.

The sleeve 20 is preferably extended at the bottom to form a cup-like, hollow extension 22, presenting the lubricant-containing main reservoir 23. At the top the sleeve is provided with a hook-shaped engaging device 24 adjustably mounted thereon by the set screw 25. This device fits into an annular groove 26 in the exterior of the pulley hub and insures the retraction of the pulley when the sleeve 20 is moved to unclutching position.

The hub of the pulley is provided preferably at its exterior surface with a channel 27 extending circumferentially thereof. An endless transmitter, preferably in the form of an endless, flexible chain 28, is carried in this channel 27 and dips at its lower portion into the lubricant in the main reservoir 23. Open ducts 29 extend from the bottom of the channel, preferably radially, into the hub reservoir 18. Another series of open ducts 30 extend from the channel laterally through the end of the hub to the end surface of the hub abutting the sleeve 20. The surface of the sleeve 20 against which the pulley hub bears is also preferably provided at its upper section with a plurality of radial oil retaining and distributing grooves 31.

When, therefore, the hub is rotated, the endless chain 28 picks up the lubricant in the main reservoir 23 and deposits it in the channel 27. From this channel the lubricant feeds into the hub reservoir 18 and is transmitted therefrom through the plugs 19 to the surface of the shaft. From this channel also the lubricant feeds laterally through the ducts 30 and lubricates the thrust bearing between the hub and the sleeve 20. Thus a thorough and efficient lubrication of the bearing surfaces, both between the hub and the shaft and at the thrust bearing, is effected.

The sleeve is preferably extended over or around the hub throughout the entire periphery of the hub, and the wall 32 also extends throughout the periphery of the sleeve close up to the groove 26 in the hub, so that there is no danger of lubricant being thrown or splashed out during rotation of the pulley. The main body of lubricant in the main reservoir 23 is stationary and the lubricant is picked up little by little by the chain and thus splashing is further prevented. Not only is the lubricant fed into the reservoir 18 and through the thrust bearing during rotation, but when the pulley is stationary, any excess of lubricant remaining in the channel 27 feeds by gravity into the reservoir 18.

The construction is one that is readily applied to existing structures, particularly when the seperate bushing for the hub pulley is employed.

Having thus described the invention, what is claimed as new, and desired to be secured by Letters Patent, is:

1. A lubricated bearing construction comprising a shaft, a member having a hub rotatably mounted on the shaft, said hub being provided with an annular lubricant reservoir, a series of lubricant transmitting plugs extending through the hub shell between the reservoir and the shaft to transmit lubricant from the reservoir to the surface of the shaft, the said hub being provided with a channel extending circumferentially thereof and with open ducts extending from the bottom of the channel into the reservoir, a main lubricant reservoir beneath the channel, and an endless transmitter carried in the channel and dipping into the lubricant in the main reservoir, whereby, as the pulley rotates on the shaft, the lubricant is carried by the transmitter into the channel and fed therefrom through the ducts into the reservoir.

2. A lubricated bearing construction comprising a shaft, a pulley having a hub rotatably mounted on the shaft, a non-rotatable sleeve slidably mounted on the shaft and abutting the end of the pulley hub, an annular lubricant reservoir in the hub, a series of lubricant transmitting plugs extending through the hub shell between the reservoir and the shaft to transmit lubricant from the reservoir to the surface of the shaft, a channel in the hub extending circumferentially thereof, a hollow extension from the sleeve beneath the channel portion of the hub forming a main lubricant reservoir, an endless transmitter carried in the channel and dipping into the lubricant in the main reservoir and acting when the pulley rotates to deposit lubricant in the channel, and open ducts extending from the bottom of the channel into the hub reservoir and from the channel laterally through the end of the hub abutting the sleeve, whereby the lubricant deposited by the transmitter in the channel is fed through the ducts to the reservoir and between the abutting surfaces of the hub and sleeve.

In testimony whereof, I have signed my name to this specification.

WILLIAM SEVILLE.